United States Patent

[11] 3,614,785

| [72] | Inventor | Dale L. Kratzer |
| | | Trevose, Pa. |
| [21] | Appl. No. | 811,547 |
| [22] | Filed | Mar. 28, 1969 |
| [45] | Patented | Oct. 19, 1971 |
| [73] | Assignee | RCA Corporation |

[54] DOPPLER CORRELATION RADAR SYSTEM
10 Claims, 1 Drawing Fig.

| [52] | U.S. Cl. | 343/7.7, 343/9 |
| [51] | Int. Cl. | G01s 9/42 |
| [50] | Field of Search | 343/7.7, 9 |

[56] References Cited
UNITED STATES PATENTS

| 3,562,750 | 2/1971 | Fishbein et al. | 343/7.7 |
| 3,079,599 | 2/1963 | Caspers | 343/7.7 UX |

Primary Examiner—T. H. Tubbesing
Attorney—Edward J. Norton

ABSTRACT: A continuous wave Doppler radar system which is modulated by a repetitive binary code in which the binary value of the bits of one-half the code vary in a pseudo-random manner and the bits of the other half of the code all have the same binary value is utilized to provide two time-multiplexed channels, one of which is an "all range" channel having a sound output and the other of which is a "range bins" channel having a visual output. The repetitive code utilized in the "all range" channel inherently provides this channel with a sensitivity time control (STC) that makes the sensitivity of the channel vary directly with the range to the target. In the "range bins" channel the Doppler characteristics of a particular target are derived by correlation of the return signal with the delayed portion of the transmitted signal to unambiguously determine the target range.

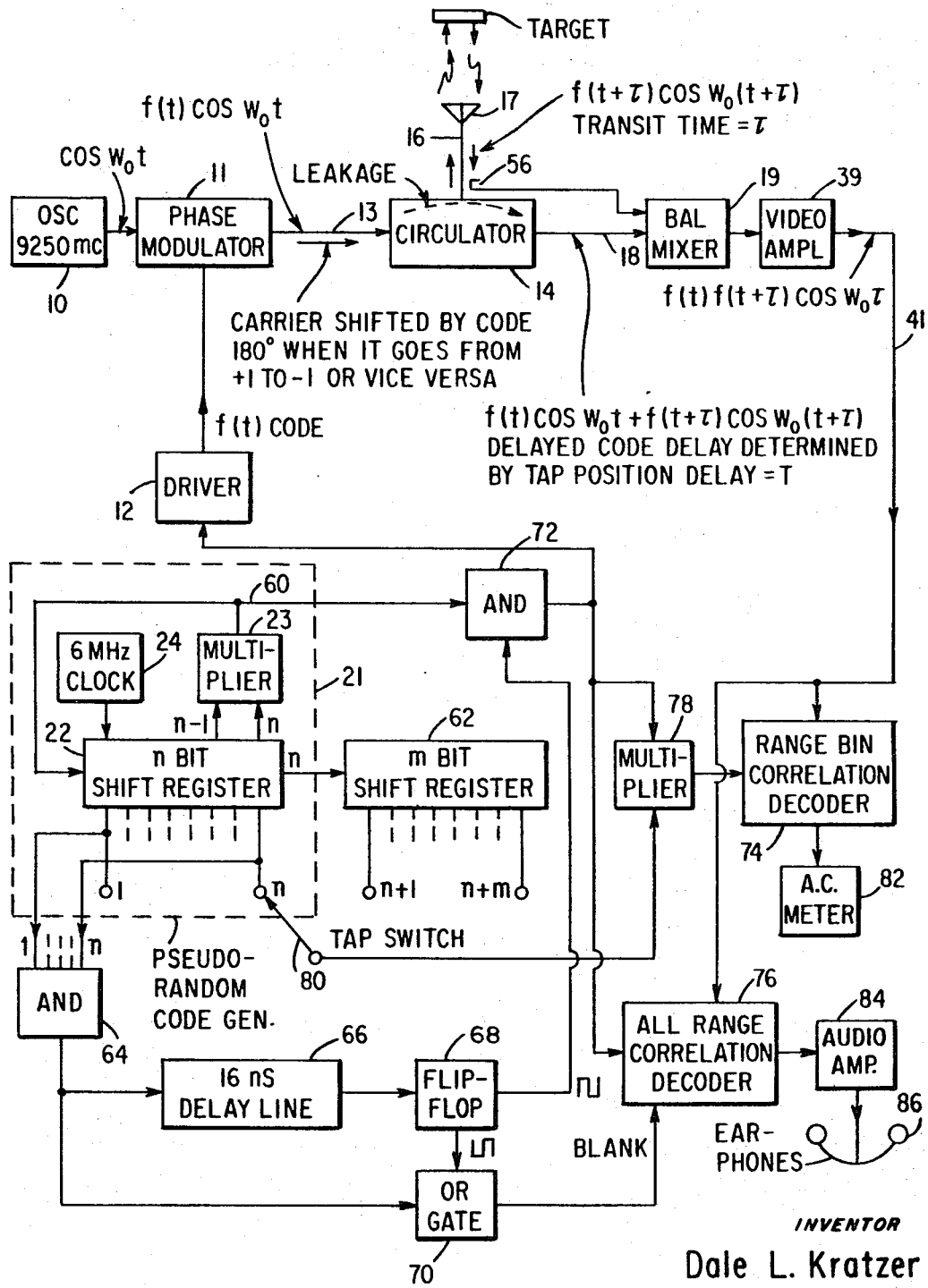

DOPPLER CORRELATION RADAR SYSTEM

This invention relates to Doppler correlation radar systems and, more to such systems utilizing a repetitive preselected binary code.

In U.S. Pat. No. 3,386,095, issued to G. H. Stevens on May 28, 1968, there is disclosed a Doppler correlation radar system designed particularly for detecting and locating moving targets such as enemy soldiers or vehicles that are moving under cover of darkness or under cover of a forest, for example. In this system a continuous wave carrier signal is phase modulated in accordance with a preselected binary code, received echo signals are mixed with the carrier signal then being transmitted, and the mixed output is correlated against a locally derived binary code signal to produce an audio Doppler signal manifesting a moving target. The radar operator listens to the Doppler audio signal over phones which are provided. This system may be alternatively operated in either an "all range" mode or a "range bins" mode, depending upon the position of a mode selection switch therein. In the "all range" position, one type of code consisting of square wave signals having certain preselected frequencies are utilized respectively for the preselected code which phase modulates the carrier signal and for the locally derived code which is correlated against the mixed output, which provides the required (STC) sensitivity time control, i.e., the varying of the Doppler signal amplitude directly with the range of a moving target. In the case of the "range bins" mode, another type of code is utilized which consists of a pseudorandom code as the transmitted preselected code and this same pseudorandom code with a selected delay as the locally derived code signal.

The present invention is directed to the use of a novel preselected code for phase modulating the continuous carrier signal of a Doppler correlation radar system which inherently is capable of providing (STC) sensitivity time control in the performance of the "all range" function of the system, while also being inherently capable of performing the "range bins" function of the system. This makes it possible in an embodiment of the present invention, to provide a Doppler correlation radar system with two time-multiplexed channels for simultaneously manifesting both "all range" information and "range bins" information.

It is therefore an object of the present invention to provide an improved Doppler correlating radar system.

In accordance with one feature of the embodiment of the invention which will be described, the "all range" information is presented aurally to the radar operator by means of head phones, while the "range bins" information is presented visually to the radar operator by means of a meter.

These and other objects, features and advantages of the present invention will become more apparent from the following detailed description together with the accompanying drawing in which:

The sole FIGURE is a block diagram of a radar system embodying the invention.

That portion of the radar system shown in the drawing comprising elements 10, 11, 12, 13, 14, 16, 17, 18, 19, 39, 41, and 56 is identical in structure and function to the portion of the radar system shown in FIG. 1 of U.S. Pat. No. 3,386,095, discussed above, which is comprised of those respective elements identified with the same reference numerals. Further shown in the drawing of the present invention is pseudorandom code generator 21, composed of 6 MHz. clock 24, which drives $n$-bit shift register 22, and multiplier 23. Multiplier 23 is an exclusive NOR gate which has separate inputs from the $(n-1)$ and the $n$ stages of register 22 and has its output connected to the input stage of register 22. Pseudorandom code generator 21, as is known in the art, repetitively generates a code of $(2^n - 1)$ successive binary bits at a bit repetition rate equal to that of clock 24. Thus, the generated code has an odd number of bits therein. The code is characterized as pseudorandom because the sequence of bits is noise like. The number of bits in the code having a given binary value exceeds the number of bits therein not having this given binary value by only one. For instance, in practice $n$ may have the value six. In this case, the pseudorandom code contains a total of 63 successive bits of which 32 have one binary value and 31 have the opposite binary value.

The pseudorandom code appears as a signal on conductor 60 from multiplier 23, wherein bits having the given binary value are manifested by a first amplitude level and bits not having this given binary value are manifested by a different second amplitude level. A similar type signal manifesting the code also appears on the output of each one of the $n$ stages of register 22 with a delay of one bit with respect to the signal present on the output of the preceding stage.

An output from the $n$th stage of register 22 is applied as an input to $m$ bit shift register 62 for providing an individual pseudorandom coded signal at the output of each of its stages with respective delays extending from $(n+1)$ bit periods to $(n+m)$ bit periods. In practice $m$ may be 34 bit periods, for instance.

The output from each of the respective stages $1 ... n$ of shift register 22 are connected as respective inputs to AND-gate 64. This results in an output from AND-gate 64 occurring once during each successive pseudorandom code cycle in a predetermined bit position thereof. The output from AND-gate 64 is applied through delay line 66 to the input of flip-flop 68, which is operated as a frequency divider. The output of AND-gate 64 is also applied as a first input to OR gate 70.

Flip-flop 68 produces a first output having a given binary value only during the entire occurrence of each alternate cycle of the pseudorandom code generator 21 and a second output of opposite binary value from said first output. The first output from flip-flop 68 is applied as a first input to AND-gate 72 and the second output therefrom is applied as a second input to OR gate 70. The pseudorandom code present on conductor 60 is applied as a second input to AND-gate 72. The output from AND-gate 72 during each pair of successive cycles of the pseudorandom code on conductor 60 constitutes the repetitive preselected binary code, and is made up of a group of successive bits double in number to those making up a cycle of the pseudorandom code. For example, if the pseudorandom code is composed of 63 bits, the preselected binary code will be composed of 126 bits. One-half the bits of the preselected binary code, which occur when the output from flip-flop 68 has its given binary values corresponding to the bits in one cycle of the pseudorandom code. The other half of bits of the preselected binary code, which occur when the output of flip-flop 68 does not have its given binary value, all have the same binary value.

The preselected binary code appearing at the output of AND-gate 72 is applied through driver 12 to phase modulator 11, which shifts the phase of carrier frequency oscillations from oscillator 10 by 180° in accordance with the binary value of each bit of a preselected binary code. The phase-modulated carrier from phase modulator 11 is forwarded through circulator 14 to antenna 17 and is then transmitted. A small portion of this transmitted signal is picked up by a coupler 56 and applied as a first input to balanced mixer 19. Signals reflected from targets are received by antenna 17 and forwarded through circulator 14 and line 18 to a second input of balanced mixer 19. The output of balanced mixer 19, after amplification by video amplifier 39, is applied over conductor 41 as a first input to both range bin correlation decoder 74 and all-range correlation decoder 76.

The preselected binary code appearing at the output of AND-gate 72 is also applied as a first input to multiplier 78 and as a second input to all-range correlation decoder 76. Any selected one of the $(n+m)$ pseudorandom code signals appearing on the respective outputs of the stages of shift register 22 and shift register 62 is applied as a second input to multiplier 78 in accordance with the position of tap switch 80. The output of multiplier 78 is applied as a second input to range bin correlation decoder 74. For reasons to be discussed in more detail below, range bin correlation decoder 74 produces an audio signal output manifesting the Doppler signal component from a moving target located within the range bin interval corresponding to the setting of tap switch 80. The audio signal output of range bin correlation decoder 74 is applied to AC meter 82 which provides a visual indication thereof.

The output from OR gate 70 is applied as a blanking third input to all range correlation decoder 76. Decoder 76 includes gates which when enabled permit correlation of the signals applied to the first and second inputs thereof to take place. Decoder 76 is enabled in the absence of a blanking signal on the third input thereof and is disabled in the presence of such a blanking signal. For reasons to be discussed below, a sensitivity time controlled (STC) audio signal manifesting the Doppler component of moving targets located anywhere within the maximum range of the system appears at the output of decoder 76. After amplification by audio amplifier 84, these audio signals are applied to earphones 86, so that they may be heard by the radar operator.

As previously mentioned, in practice the number of stages, $n$, in register 22 is relatively large, such as 6 to provide a large pseudorandom code of 63 bits and an even larger transmitted preselected binary code of 126 bits. This relatively large number of bits in the transmitted preselected binary code is desirable for the purpose of obtaining the high resolution and signal to noise ratio required in the correlation detection which takes place in decoders 74 and 76. Further, since the bit repetition rate of 6 MHz provided by clock 24 results in each range bin interval corresponding to 25 meters, and since the maximum range of the system may be 1000 meters, in practice $m$ bits shift register 62 may have 34 stages in order to provide a total of 40 range bins, each corresponding to 25 meters, to which tap switch 80 has access. However, in order to simplify the description of the operation of the system, $m$ bits shift register 62 will be neglected and the value of $n$ of $n$ bits shift register 22 will be assumed to be only 3.

If $n$ is 3, each cycle of the pseudorandom code will be composed of 7 bits, since there are $2^n-1$ bits in each cycle of the pseudorandom code, and the total number of bits in the transmitted preselected code will be 14.

For the purposes of this discussion, bits having a given binary value will be designated with a "+" sign and bits not having this given binary value will be designated with a "−" sign. The respective binary values of a typical cycle of a 7 bit pseudorandom code developed by generator 21 when shift register 22 is a three bit shaft register may be:

—++—+—. This will result in the following 14 bit preselected binary code being derived on the output of AND-gate 72:

—++—+————————.

As discussed above, this preselected binary code is used to provide a 180° phase modulation of the transmitted carrier frequency signal. Received echo signals from a moving target will differ from the transmitted signal in two respects. First, they will be delayed by a certain number of bit periods which depend on the range of the moving target and, the carrier of the received echo signals will be shifted in frequency with respect to the frequency of the transmitted carrier signal by an amount which depends upon the velocity of that moving target.

For illustrative purposes, the following three cases will be considered: (1) 0 bit delay, representing zero range; (2) 3 bit delay, representing 75 meter range; and (3) 7 bit delay, representing 175 meter range. The respective binary values of the bits appearing at the output of balanced mixer 19 manifests the product of the preselected binary code then being transmitted and the delayed preselected binary code then being received from a moving target. These codes and the output of balanced mixer 19 for each of the illustrative cases is the following:

| 1. 0-bit delay | Trans. code | —++—+———— |
| | Rec. code | —++—+———— |
| | Mixed output | ++++++++++++++ |

| 2. 3-bit delay | Trans. code | —++—+———— |
| | Rec. code | ————++—+—— |
| | Mixed Output | +——++—+++++++ |

| 3. 7-bit delay | Trans. code | —++—+———— |
| | Rec. code | ————————++—+— |
| | Mixed Output | +——+—+++——+—++ |

The mixed output, after amplification by video amplifier 39, is applied to one of the inputs of each of decoders 74 and 76, as previously described. The preselected binary code at the output of AND-gate 72 is also applied as an input to decoder 76. However, decoder 76 is enabled only during the occurrence of a subgroup of bits of the preselected binary code and is disabled during the occurrence of more than one-half of the bits in the preselected binary code, as shown below, where X represents a bit position in which a blanking signal is applied to the decoder 76 from OR-gate 70,

| Preselected code | —++—+———— |
| Gate 70 output | X XXXXXXX |
| Subgroup of Preselected Code | X++—+—XXXXXXX |

It will be seen that decoder 76 is enabled only during the occurrence of the second to the seventh bit of a cycle of the preselected code, i.e., the subgroup of the preselected code occurs during the first half of the preselected binary code when AND-gate 72 is passing a cycle of the pseudorandom code from generator 21. As will become more apparent, the subgroup of the preselected code provides a window for correlating those bits of the mixed output from moving targets at different ranges which occur during the occurrence of the bits of the window. Besides including only bits forming part of the pseudorandom code, it is desirable that the number of bits in the subgroup be an even number because it is not possible to achieve a correlation of zero when the number of bits being correlated is an odd number. It is for this reason that the first bit of the preselected code is blanked. If one-half the number of bits in the preselected code had been an even number to begin with, it would not have been necessary to blank any of the bits in this first half of the preselected code. Further, in order to maximize the signal to noise ratio of the correlation decoder, it is preferable that the subgroup of the preselected code include as many bits as possible consistent with the aforesaid constraints. However, the window provided by this subgroup of the preselected code may contain fewer number of bits without violating the principles of the invention.

Due to the fact that the mixed output applied to all-range correlation decoder 76 includes a Doppler component derived from received echoes of moving targets, the output from all-range correlation decoder 76 will comprise an audio frequency signal manifesting such moving targets. The relative amplitude of this audio signal depends upon the correlation which exists between the mixed output and the preselected binary code solely during the occurrence of the bits making up the subgroup of the preselected binary code, i.e., during the occurrence of the second to the seventh bits of each cycle of the preselected binary code in the illustrative example.

Correlation is defined as the value of the sum of the product of two time-varying functions over a given time interval divided by this given time interval. Here, the given time interval is the number of bit periods in the subgroup, namely, six, and the two time-varying functions are respectively the binary value of the bits of the subgroup and the binary value of those bits of the mixed output which occur simultaneously with the bits of the subgroup. Shown below is the correlation output of decoder 76 for each of the three cases discussed above, i.e., 0-bit delay, 3 bit delay, and 7-bit delay.

(1) 0 bit delay

Sub-group  ++−+−−
Mixed Output ++++++

"All Range" Correlation Output $\frac{\Sigma(+++-+--)}{6}=0$ (2) 3 bit delay

Sub-group  ++−−+−−
Mixed Output −−++−+

"All Range" Correlation Output $\frac{\Sigma(---++-)}{6}=-\frac{2}{6}=-\frac{1}{3}$ (3) 7 bit delay Sub-group  ++−+−−
Mixed Output −−+−++

"All Range" Correlation Output $\frac{\Sigma(------)}{6}=-\frac{6}{6}=-1$

It will be seen that the absolute magnitude of the correlation output from correlation decoder 76 increases with increasing bit delay, i.e., with increasing range of a moving target. This inherently provides the required sensitivity time control (STC) in the all-range channel. The sign of the correlation output, whether negative or positive, is of no significance.

The operation of the range bin channel will now be considered. Multiplier 78 produces as an output signal, which is applied as an input to correlation decoder 74, the product of the preselected code and a selectively delayed pseudorandom code, having a delay controlled in accordance with the setting of tap switch 80. As shown below, each cycle of the preselected code is associated with two successive cycles of the pseudorandom code, since the preselected binary code contains twice as many bits as does the pseudorandom code.

1. 0-bit delay

Preselected code  +++−−−−
Pseudorandom code  −++−+ −++−+−

Multiplier 78 output ++++++++−−−+−+
+

2. 3-bit delay

Preselected code  +++−−−−
Pseudorandom code  +−−++−+−−++−

Multiplier 78 output −−++−+−+++−−−+

3. 7-bit delay

Preselected code  +++−−−−
Pseudorandom code  −++−+ −++−+−

Multiplier 78 output ++++++++−−−+−+

Range bin correlation decoder 74 correlates the output of multiplier 78 against the mixed output which is also applied thereto. If, by way of example, tap switch 80 is set to provide a 3 bit delay, the following is the correlation output of decoder 74 for each of separate moving targets having a range corresponding to a 0-bit delay, a 3-bit delay, and a 7-bit delay, respectively:

3 bit delay multiplier 78 output  −−−++−+−+++−−+
0 bit delay mixed output  ++++++++++++++

"Range Bins" Correlation $\frac{\Sigma(---++-+-+++--+)}{14}=0$ 3 bit delay multiplier 78 output  −−−++−+−+++−−+
3 bit delay mixed output  +−−++−+−+++++++

"Range Bins" Correlation output $\frac{\Sigma(-++++++++++--+)}{14}=\frac{8}{14}=\frac{4}{7}$ 3 bit delay multiplier 78 output  −−−++−+−+++−−+
7 bit delay mixed output  +−−+−+++−−−+−++

"Range Bins" Correlation output $\frac{\Sigma(-+++--+---++-+)}{14}=0$

It will be seen that a correlation output is produced from range bins correlation decoder 74 only in response to a moving target which is at a range corresponding to a 3-bit delay, when tap switch 80 is set to provide a 3-bit delay. Thus, generalizing, the setting of tap switch 80 controls the particular range bin to which range bin correlation decoder is responsive.

Therefore, when the radar operator hears a tone in his earphones 86, indicating the presence of a moving target within the field pattern of antenna 17, the operation of tap switch 80 through its various settings will indicate the particular range bin in which the moving target is located by a movement of the needle of AC meter 82, indicative of an audio frequency correlation output signal from range bin correlation decoder 74, when tap switch 80 is set to this particular range bin.

What is claimed is:

1. In a Doppler correlation radar system of the type in which received echoes of a transmitted continuous carrier signal, which has been phase modulated in accordance with a repetitive preselected binary code signal, is mixed with the carrier signal then being transmitted, and the mixed output is correlated against a locally derived binary code signal to produce an audio signal manifesting a moving target; the improvement therein of code generating means for repetitively generating as said preselected binary code signal a group of N successive bits having respective binary values in accordance with said preselected code, wherein N is a given plural integer, said group of bits including a subgroup of successive bits equal in number to no more than one-half of N, and correlation means coupled to said code generating means and having said mixed output applied thereto for correlating the binary value of solely the bits of said subgroup against the binary value of solely those bits of said mixed output which occur during the occurrence of said bits of said subgroup to provide an audio output signal manifesting a moving target which has an amplitude which varies directly both with the amplitude of the received echoes and with the amount of correlation which exists, said preselected code being chosen to provide an amount of correlation which varies directly with the range of a moving target.

2. The system defined in claim 1, wherein said code generating means comprises means for generating as said preselected binary code a code such that within said subgroup the number of bits having one binary value is equal to the number of bits having the other binary value, while outside of said subgroup the number of bits having one binary value significantly exceeds the number of bits having the other binary value.

3. The system defined in claim 2, wherein said code generating means comprises means for generating as said preselected code a code in which all the bits of said preselected code outside of said subgroup have the same binary value.

4. The system defined in claim 1 wherein N is an even integer, and wherein said code generating means includes first means for cyclically generating at a given bit repetition rate a first binary code composed of N/2 successive bits per cycle, said first binary code being characterized in that the number of bits thereof having one binary value does not exceed the number of bits thereof having the other binary value by more than one, second means including a frequency divider and gate for passing only alternate cycles of said first code for deriving as a first half of said preselected code one cycle of said first code and as a second half of said preselected code a second binary code composed of N/2 successive bits all of which have the same given binary value, and third means coupled to said second means for determining the bits composing said subgroup from only the bits of said first code.

5. The system defined in claim 4, wherein said first means includes means for generating as said first code a code in which there is an odd number of bits in said first binary code and the number of bits thereof having a first binary value exceeds by one the number of bits thereof having a second binary value, and wherein said third means includes means to provide that said subgroup determined by said third means includes all bits of said first binary code having said second binary value and all except one of said bits of said first binary code having said first binary value.

6. The system defined in claim 5, wherein said correlation means is selectively operable to correlate signals applied respectively to first and second inputs thereof in accordance with a control signal applied to a third input thereof, means for applying said preselected code from said second means to said first input of said correlation means and for applying said mixed output to said second input of said correlation means and means for applying an output signal from said third means to said third input of said correlation means to selectively enable said correlation means only during the occurrence of said subgroup of bits.

7. The system defined in claim 4, further including delay means coupled to said first means for delaying said cyclic first code a selected number of bit periods, a multiplier coupled to said delay means and said second means for multiplying the binary value of each respective delayed bit from said delay means by the binary value of the then-occurring bit of said preselected code to produce a stream of binary bits at the output of said multiplier, and second correlation means coupled to said multiplier and having said mixed output applied thereto for correlating said stream of binary bits with the bits of said mixed output, whereby said second correlation means produces a maximum audio frequency signal output when said selected delay corresponds with that particular one of a plurality of range bin intervals in which said moving target is located, the length of a range bin interval being determined by said bit repetition rate.

8. The system defined in claim 7, wherein delay means includes means for adjusting said selected delay to correspond with anyone of said plurality of range bin intervals.

9. The system defined in claim 8, including first audio-signal responsive indicating means coupled to the output of said first-mentioned correlation means and second audio-signal responsive indicating means coupled to the output of said second correlation means.

10. The system defined in claim 9, wherein said first indicating means comprises a sound transducer and wherein said second indicating means includes a meter responsive to the amplitude of the audio frequency signal from said second correlation means.